March 18, 1952

A. LIECHTI 2,589,831

ELECTRICAL CONDENSER

Filed March 5, 1949

INVENTOR
ALBERT LIECHTI.
BY K. A. Mays
ATTORNEY

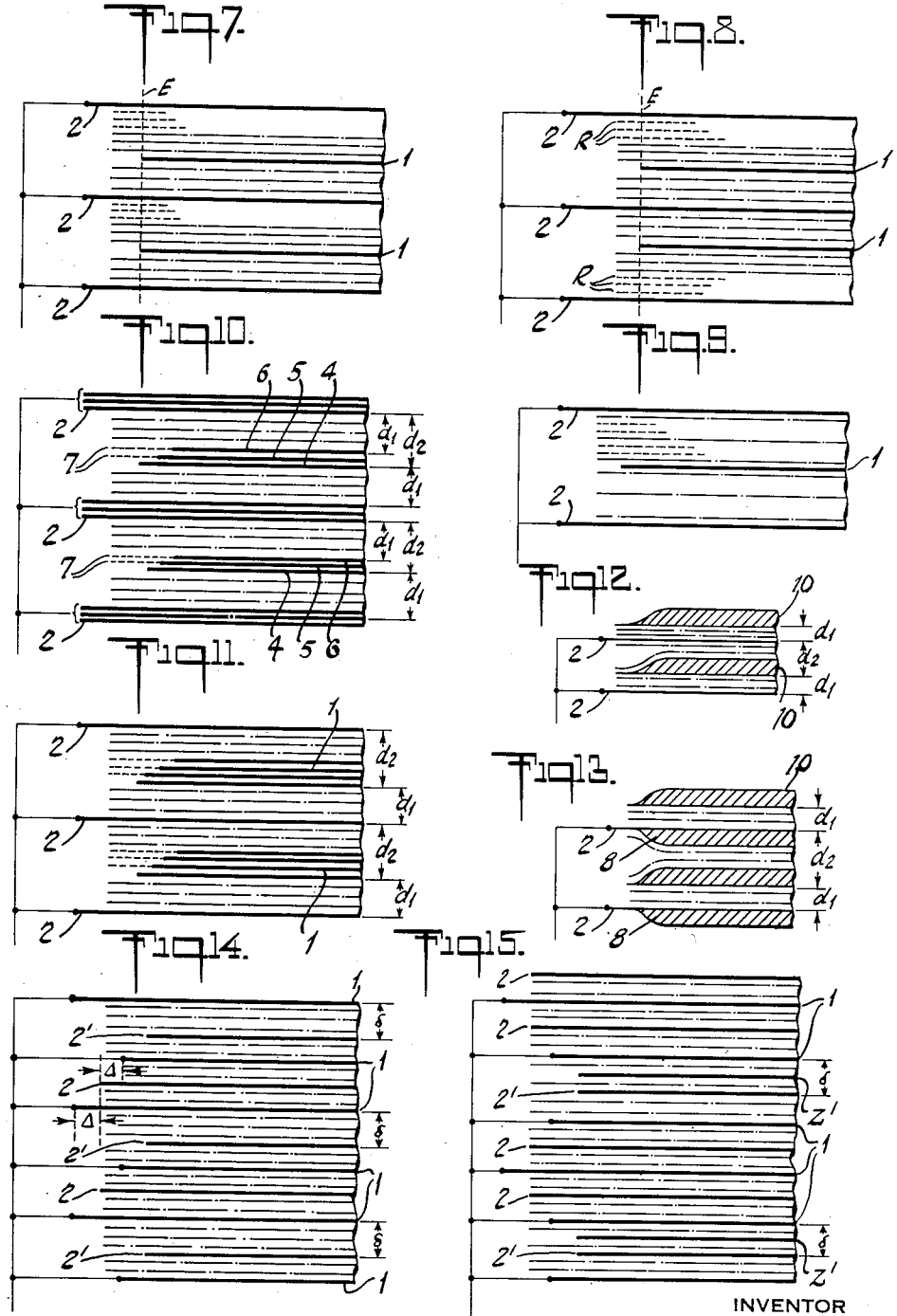

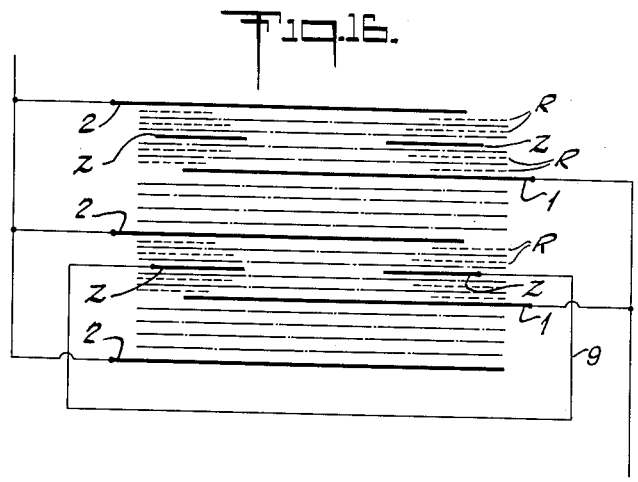
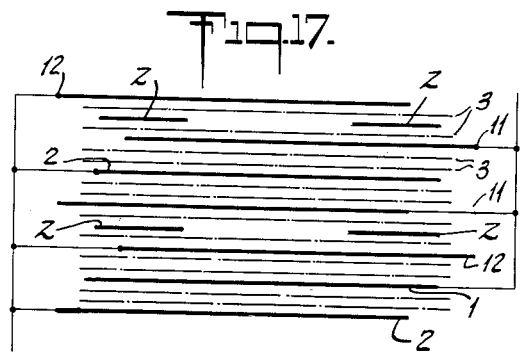
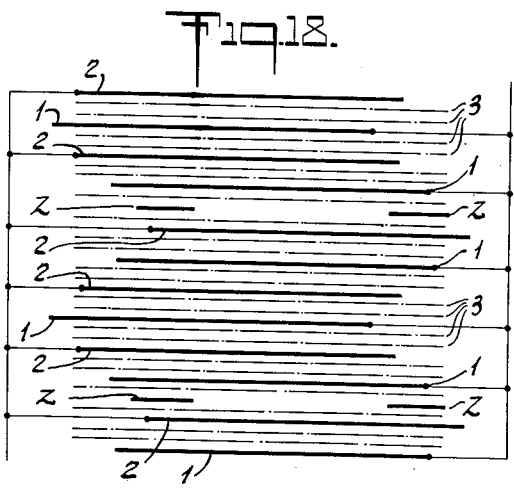

Patented Mar. 18, 1952

2,589,831

UNITED STATES PATENT OFFICE 2,589,831

ELECTRICAL CONDENSER

Albert Liechti, Zurich, Switzerland, assignor to Micafil A. G., Zurich-Altstetten, Switzerland, a corporation of Switzerland Application March 5, 1949, Serial No. 79,817
In Switzerland March 6, 1948

4 Claims. (Cl. 175—41)

The present invention relates to improvements in electrical condensers composed of metal foils separated by layers of insulating material such as oil-impregnated paper. High dielectric loads produce glow phenomena which lead to formation of gas whereby at a certain voltage, known as the ionization voltage, the dielectric and consequently the whole condenser is destroyed. Breakdown tends to take place at the edges of the metal foils and the capacity of the dielectric cannot be fully utilized.

It has been proposed to make the dielectric thicker in the neighborhood of the edges of the condenser electrodes. The electrodes, insulating sheets, sheets interposed in the marginal portions and reinforcement of said portion, however, were arranged symmetrically to the conducting plates connected to a terminal of the condenser.

Tests and theoretical considerations have shown that it is of advantage to arrange the layers asymmetrically whereby a considerably greater load may be carried because of increased ionization tension or capacity.

It is an object of the present invention to arrange asymmetrically, in an electric condenser having several conducting plates galvanically connected with the condenser terminals and separated by dielectrics individually composed of several insulating sheets, at least in the marginal zones extending from the edges of the conducting plates to the interior of the condenser to the extent of the thickness of the dielectric between two plates of opposite polarity, between two neighboring plates of the same polarity and connected with the same terminal, all conducting plates including the ones defining the space under consideration. The term "electrically asymmetric" is used for an arrangement of relative position of the marginal portions of neighboring conductive plates and/or thickness or dielectric strength of the dielectric between plates of opposite polarity which arrangement causes the vector of maximum field strength to extend at an angle from the plane of the plates whereby the component of the field strength in said plane is reduced.

Further and other objects of the present invention will be hereinafter set forth in the accompanying specification and claims and shown in the drawings, which by way of illustration show what I now consider to be preferred embodiments of the invention.

In the drawings:

Fig. 7 is a schematic sectional view of a marginal portion of a further modification of a condenser according to the invention;

Fig. 8 is a schematic sectional view of a marginal portion of a further modification of a condenser according to the invention;

Fig. 9 is a schematic sectional view of a marginal portion of a further modification of a condenser according to the invention;

Fig. 10 is a schematic sectional view of a marginal portion of a further modification of a condenser according to the invention;

Fig. 11 is a schematic sectional view of a marginal portion of still another modification of a condenser according to the invention;

Fig. 12 is a schematic sectional view of a marginal portion of a condenser according to the invention having modified conductive plates;

Fig. 13 is a schematic sectional view of a modified condenser according to the invention having all conductive plates constructed in a modified manner;

Figs. 14 and 15 illustrate schematically two arrangements in which the asymmetry according to the invention is obtained by special placement of the conductive plates;

Fig. 16 is a schematic sectional view of the whole width of a section of a condenser according to the invention;

Fig. 17 illustrates schematically a modification of the condenser shown in Fig. 14; and Fig. 18 a modification of the condenser shown in Fig. 15.

Like parts are designated by like letters and numerals in all figures of the drawings.

Figure 1:
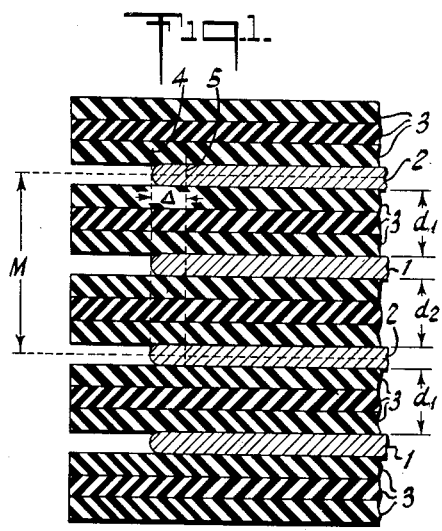
Figs. 1 and 2 are schematic sectional views of conventional arrangements.
Figure 2:
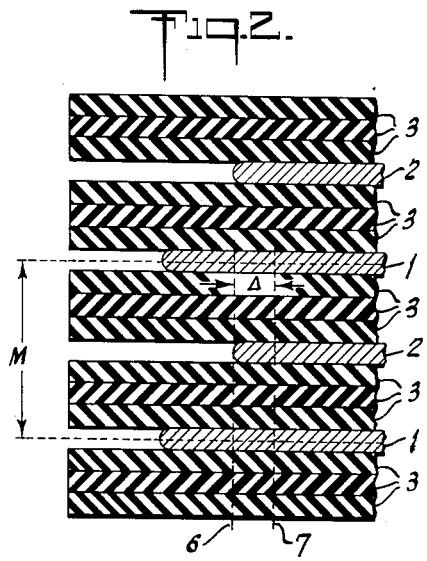

Figures 1 and 2 show a part of lateral marginal portions of conventional condensers, on a much enlarged scale. All conducting plates 1 are connected with one terminal and all plates 2 with the other terminal of the condenser. Insulating sheets 3 are interposed between the conducting plates 1 and 2.

In the conventional construction shown in Fig.

1, plates of one polarity extend into the marginal portions Δ between the plates of the opposite polarity whereas in the construction according to Fig. 2 only the plates 1 extend into the marginal portions Δ of plates 2. Plates 2 do not extend between the marginal portions of plates 1. The conditions of symmetry according to the invention are applicable to all conducting plates in a condenser according to Fig. 1 and in a condenser according to Fig. 2 to plates 2 only.

If a conventional condenser according to Fig. 1 were modified according to the invention, the arrangement of all conducting plates in the space M defined by two neighboring plates 2 which are connected with the same terminal, i. e. in the case shown the two plates 2 only, would have to be arranged asymmetrically in the marginal zone defined by dotted lines 4 and 5.

Analogously, if the conventional arrangement shown in Fig. 2 were changed according to the invention, the plates in the space M, i. e. the plates 1 only, would have to be arranged asymmetrically in the marginal zone of plate 2 between dotted lines 6 and 7.

For a practically considerable increase of the load which can be carried by the condenser a section must be chosen as marginal zones 4, 5 or 6, 7 which extends toward the interior of the condenser at least by the depth Δ which corresponds approximately to the distance between two plates of different polarity. This, however, calls for extremely exact winding machines, and, for the time being, the marginal portions will be extended over at least one to two-tenths of a millimeter.

The asymmetry according to the invention may be obtained in several ways: for example, by varying the distance between consecutive neighboring plates, or by staggering the edges of the plates, or by a combination of both methods.

A symmetric condenser as shown in Fig. 1 may be made asymmetric by reducing the thickness of the dielectric on one side of a conducting plate in relation to the thickness of the dielectric on the same side of the neighboring plates of opposite polarity. If in the symmetric condenser according to Fig. 1 the equal distances $d_1$ and $d_2$ correspond to a minimum which is absolutely necessary for a certain ionization tension $U_I$ and asymmetry is produced by making $d_1$ smaller than $d_2$ the ionization tension will not be changed, although the distances $d_1$ would be too small for a symmetric arrangement, whereas the capacity and the load which may be carried by the condenser are considerably increased.

Figure 3:
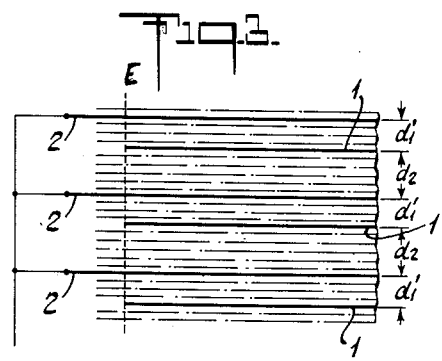
Fig. 3 is a schematic sectional view of one marginal portion of a condenser according to the invention.

Fig. 3 shows a condenser of this type. The plates 2 may project at one side beyond the dielectric sheets which are indicated by dash-dot lines and the plates 1 at the other side. The distance $d_2$ corresponds to the minimum required for an ionization tension $U_I$ of a symmetric condenser. The distance $d_1$, however, is considerably smaller than $d_2$ for producing the asymmetry according to the invention without reducing the ionization tension, i. e. the tension at which the impregnation of the dielectric adjacent to the edge of a condenser plate is ionized. In symmetric condensers, the ionization tension or voltage is smaller than the tension or voltage at which the current breaks through the dielectric between plates of opposite polarity. In an asymmetric condenser constructed according to the invention, both tensions can be the same and $d'_1$ may be reduced to the minimum required to assure electric impermeability and a considerable increase in capacity and load can be obtained thereby. The arrangement according to Fig. 3 may also be used if all conducting plates end within the dielectric, for example at the plane indicated by the dotted line E.

Figure 4:
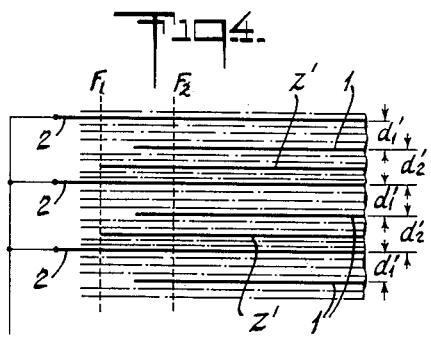
Fig. 4 is a schematic sectional view of a marginal portion of a modified condenser according to the invention.

A further increase in the load which may be carried by the condenser, may be obtained by making, in addition to the reduction of the thickness $d_1$, $d_2$ also smaller than the minimum required in symmetric construction and inserting a conductive sheet Z', as shown in Fig. 4. The ionization tension remains the same and the capacity is still more increased. The intermediary sheet Z' may extend through the whole condenser but may be limited to a zone, for example, between the planes indicated by dotted lines $F_1$ and $F_2$. Not only may one or more conductive sheets Z' be inserted in the dielectric of the thickness $d'_2$, but also in the dielectric $d'_1$, whereby the number of intermediary layers in one dielectric may be different from that in the other.

Figure 5:
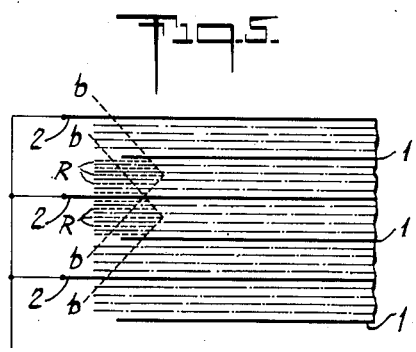
Fig. 5 is a schematic sectional view of a marginal portion of another modification of a condenser according to the invention.
Figure 6:
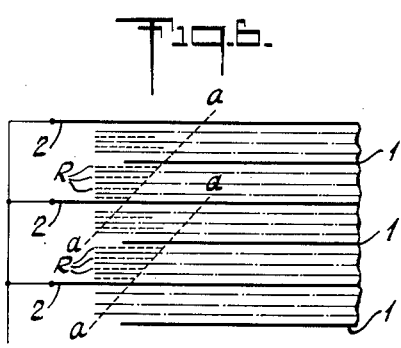
Fig. 6 is a schematic sectional view of a marginal portion of a further modification of a condenser according to the invention.

In the arrangements shown in Figs. 5 and 6 intermediary dielectric sheets R are interposed in the marginal portion of the condenser and between the full-size sheets whereby, after pressing, the desired asymmetry is produced, no matter whether the condenser is finished as a roll or as a pile. The intermediary dielectric strips have different widths and may be arranged to form wedges defined by lines b as in Fig. 5 or steps defined by lines a as in Fig. 6.

The intermediary dielectric strips may be arranged in packages, on one side of the conducting plates as in Fig. 7, or on different sides as in Fig. 8. In the arrangement shown in Fig. 7, all conductive plates may terminate along the plane indicated by line E without impairing the asymmetry with respect to the individual conductive plates. This is not possible in the arrangement according to Fig. 8 because if plates 2 would be shortened, plates 1 would extend into the marginal portions between plates 2 and there would be symmetry with respect to plates 2. According to the invention, there must be electric asymmetry at all marginal portions into which extend conducting plates of different polarity.

The intermediary strips may be interposed between the full-size sheets individually, as in Figs. 5 and 6, or in groups, as shown in Fig. 9. For simplicity's sake the dielectric arrangement is shown in Fig. 9 between two conductive plates of the same polarity only. The width and arrangement of the intermediary strips must also be so chosen that the metal foils are deformed as little as possible when the pack is compressed and bends and cracks are avoided, i. e. the increase of thickness in the dielectric must be continuous from the interior to the edge.

A preferred arrangement for producing asymmetry of the marginal portions without varying the spacing between the conductive foils, as in Figs. 3 and 4, and without necessitating bending of the metal foils as is the case with the arrangements according to Figs. 5 to 9, after pressing, is illustrated in Fig. 10. There, the individual conductive plates are composed of superimposed and conductively connected foils. The edges of foils 4, 5 and 6 forming plates of one polarity are arranged in steps and the steps are filled with dielectric intermediary strips 7 whereby the whole stack has the same thickness, although the electric asymmetry according to the invention is present in the marginal portions of the condenser, as is apparent by comparing the distances designated by $d_1$ and $d_2$ in Fig. 10.

Instead of building up the plates of both polarities individually of a plurality of individual foils as shown in Fig. 10, plates of one polarity only may be built up of individual foils arranged in steps at their edges, as shown in Fig. 11.

At least the conducting plates connected with one terminal of the condenser may be formed as flat hollow bodies 10 having tapered edges as shown in Figs. 12 and 13 for obtaining the same result as with the arrangements according to Figs. 10 and 11. The inside of the hollow body 10 which is shown shaded in Figs. 12 and 13 may be filled with electrically conductive or insulating material. In the modification shown in Fig. 12 only plates connected with one condenser terminal are constructed in this manner. In Fig. 13 the conductors 10 connected with one terminal as well as the conductors 8 connected with the other terminal are built as flat hollow bodies.

In the modifications illustrated schematically in Figs. 14 and 15 the edges of the conducting plates are so disposed in relation to one another as to form steps. The depth of the steps must amount at least to the value $\Delta$ which has been explained in connection with the description of Figs. 1 and 2. For assuring asymmetry with respect to the conducting plates 2' the dielectric on one side thereof is made thicker, as indicated by letter $\delta$, than on the other side.

In the embodiment according to Fig. 14 the edges of groups of conducting plates form steps in the same direction whereas in the modification according to Fig. 15 the steps of one group run in a direction opposite to that of the adjacent group. Intermediary metallic foils Z' may be interposed between the dielectric sheets in the manner shown in Fig. 4.

Asymmetry is not necessary with reference to the plates which extend farthest out of the condensers shown in Figs. 14 and 15 because no other plate extends into their marginal zones. Asymmetry is arranged for plates 2 by making the steps deeper than $\Delta$.

Intermediary strips of metallic foils Z may be placed in the marginal portions only, as shown in Fig. 16. The strips in the same interspaces may be conductively interconnected inside the condenser or outside, as indicated by conduit 9 in Fig. 16.

All arrangements shown and described may be used for pile condensers as well as for coiled condensers, round or flat, and combinations of the disclosed arrangements may be made without departing from the scope of the present invention.

Since in coiled condensers the curvature of consecutive layers is slightly different, the field distribution is not absolutely symmetric. This asymmetry, however, is several times smaller than the asymmetry which is the crux of the present invention.

Fig. 17 illustrates a modification of the condenser shown in Fig. 14. Instead of making the dielectric between the conductive foils 11 and 12 thicker than between the other conductive foils, conductive foil strips Z may be interposed at least in the marginal portions of the dielectric adjacent to conductive foils having the most receding, lateral edges.

Likewise, the arrangement according to Fig. 15 may be modified as shown in Fig. 18 by interposing conductive foil strips Z in the dielectric adjacent to one side of the conductive plate whose one lateral edge is most recessed and whose other lateral edge is most protruding with respect to the lateral edges of the other plates.

The asymmetry according to the invention may be increased by using, on different sides of a conducting plate, material of different dielectric constants whereby, as is well known, the temperature constancy of the capacity of the condenser may be improved.

While I believe the above described embodiments of my invention to be preferred embodiments, I wish it to be understood that I do not desire to be limited to the exact details of method, design, and construction shown and described, for obvious modifications will occur to a person skilled in the art.

I claim:

1. In an electrical condenser comprising alternatingly spatially superimposed electrically conductive sheets of opposite polarity and having lateral edges, and a dielectric placed between said sheets; electrically conductive sheets of the same polarity neighboring a conductive sheet of the opposite polarity and having an edge placed inside the edge of at least one of the sheets neighboring it, the dielectrics being individually built up of a pluraltiy of insulating sheets, and strips of insulating material interposed between the insulating sheets on one side of the sheet of opposite polarity and adjacent to the lateral edges thereof for making the dielectric thereat thicker than on the other side of the sheet for producing electrical asymmetry of the neighboring sheets with respect to the sheet of opposite polarity.

2. In an electrical condenser comprising alternatingly spatially superimposed electrically conductive sheets of opposite polarity and having lateral edges, and a dielectric placed between said sheets; electrically conductive sheets of the same polarity neighboring a conductive sheet of the opposite polarity and having an edge placed inside the edge of at least one of the sheets neighboring it, the dielectrics being individually built up of a plurality of insulating sheets, and groups of superimposed strips of insulating material interposed between the insulating sheets on one side of the sheet of opposite polarity and adjacent to the lateral edges thereof for making the dielectric thereat thicker than on the other side of the sheet for producing electrical asymmetry of the neighboring sheets with respect to the sheet of opposite polarity.

3. In an electrical condenser comprising alternatingly spatially superimposed electrically conductive sheets of opposite polarity and having lateral edges, and a dielectric placed between said sheets; electrically conductive sheets of the same polarity neighboring a conductive sheet of the opposite polarity and having an edge placed inside the ledge of at least one of the sheets neighboring it, the dielectrics being individually built up of a plurality of insulating sheets, and strips of different width of insulating material interposed between the insulating sheets on one side of the sheet of opposite polarity and adjacent to the lateral edges thereof and so placed as to make the dielectric thereat gradually thicker than on the other side of the sheet for producing electrical asymmetry of the neighboring sheets with respect to the sheet of opposite polarity.

4. In an electrical condenser comprising alternatingly spatially superimposed electrically conductive sheets of opposite polarity and having lateral edges, and a dielectric placed between said sheets; electrically conductive sheets of the same polarity neighboring a conductive sheet of the opposite polarity and having an edge placed inside the edge of at least one of the sheets neighboring it, the dielectrics being individually built up of a plurality of insulating sheets, and strips of different width of insulating material interposed between the insulating sheets on one side of the sheet of opposite polarity and adjacent to the lateral edges thereof and so placed as to form a wedge in the dielectric thereat for making it thicker adjacent to the edges than on the other side of the sheet for producing electrical asymmetry of the neighboring sheets with respect to the sheet of opposite polarity.

ALBERT LIECHTI.

REFERENCES CITED

The following references are of record in the file of this patent:

UNITED STATES PATENTS

| Number | Name | Date |
|---|---|---|
| 901,498 | Thomson | Oct. 20, 1908 |

FOREIGN PATENTS

| Number | Country | Date |
|---|---|---|
| 196,531 | Germany | Mar. 25, 1908 |